United States Patent [19]

Weiss

[11] Patent Number: 4,693,610
[45] Date of Patent: Sep. 15, 1987

[54] ELECTRICAL HOUSEHOLD APPLIANCE FOR CULINARY PURPOSES

[75] Inventor: Roger Weiss, Bagnolet, France

[73] Assignee: Moulinex, Societe Anonyme, Bagnolet, France

[21] Appl. No.: 804,634

[22] Filed: Dec. 5, 1985

[30] Foreign Application Priority Data

Jan. 24, 1985 [FR] France .................................. 85 00981

[51] Int. Cl.⁴ .............................................. B01F 15/06
[52] U.S. Cl. ...................................... 366/146; 99/348; 366/197; 366/341; 366/344
[58] Field of Search ................. 366/98, 144, 146, 145, 366/197, 199, 200, 201, 206, 207, 279, 331, 344; 99/348

[56] References Cited

U.S. PATENT DOCUMENTS

| 989,733 | 4/1911 | Townsend | 366/288 |
| 1,227,671 | 5/1917 | Robertson | 366/197 X |
| 1,467,820 | 9/1923 | Trust et al. | 366/331 |
| 4,325,643 | 4/1982 | Scott et al. | 366/344 X |
| 4,591,273 | 5/1986 | Meyer et al. | 366/331 X |

Primary Examiner—Timothy F. Simone
Attorney, Agent, or Firm—Young & Thompson

[57] ABSTRACT

Apparatus for food preparation comprises a bowl, a rotatable tool within this bowl, and an arm which extends over the bowl and which contains a drive device for rotating the tool. The drive device includes a pinion to engage the drive shaft of the tool, and this pinion is fixed to, or preferably integral with, the drive shaft to define a drive assembly for the tool. This drive assembly is detachably mounted within a recess provided in the arm. An opening is formed in the arm through which the recess communicates with the exterior, and this opening is arranged to allow passage of said drive assembly therethrough.

8 Claims, 4 Drawing Figures

ELECTRICAL HOUSEHOLD APPLIANCE FOR CULINARY PURPOSES

BACKGROUND TO THE INVENTION

The invention relates to electrical household appliances, and particularly to apparatus for the preparation of foodstuffs and other culinary purposes.

Electrical household appliances are known which have a base for receiving a mixing bowl, a rotatable tool such as a whisk or a blade extending within the bowl, a column extending upwardly from the base and supporting an arm which extends horizontally over the bowl. A drive device for the tool is housed within the arm and comprises a toothed wheel engaging with a pinion arranged to drive the shaft of the tool.

In such known appliances, the arm is generally mounted to be either detachable or to be pivotable on the column about a horizontal axis so as to allow removal of the bowl from its base or replacement of the mixing tool, for example, to carry out a different operation.

It is an object of the present invention, for reasons of ecomony, to eliminate the need for the arm to be detachably or pivotably mounted on the column such that, if required, this arm can be rigidly mounted on the column.

SUMMARY OF THE INVENTION

According to the present invention there is provided apparatus for food preparation comprising a base, a mixing bowl received on said base, a rotatable tool within said bowl, a column extending upwardly from said base and having a top end, an arm extending substantially horizontally above the bowl, said arm being supported by the top end of said column and said arm having a free end, an upwardly extending drive shaft of said tool being engageable with said arm, and drive means for said tool contained within said arm, said drive means including a pinion for rotating the drive shaft of said tool, wherein said pinion is fixed to said drive shaft to thereby form a drive assembly for the tool, and a recess is formed within the free end of said arm within which said drive assembly can be detachably mounted, and wherein an opening is provided in said arm and communicates said recess with the exterior, said opening being arranged to enable said drive assembly to be moved into and out of said recess.

With apparatus of the invention, it is possible, even if the arm is mounted in fixed fashion on the column, to remove the tool easily, with or without the simultaneous removal of the bowl.

The invention also extends to apparatus for food preparation comprising a base, a mixing bowl received on said base, a rotatable tool within said bowl, a column extending upwardly from said base and having a top end, an arm extending substantially horizontally above the bowl, said arm being supported by the top end of said column and said arm having a free end, an upwardly extending drive shaft of said tool being engageable with said arm, and drive means for said tool contained within said arm, said drive means including a pinion for rotating the drive shaft of said tool, wherein said pinion is fixed to said drive shaft to thereby form a drive assembly for the tool, and a recess is formed within the free end of said arm within which said drive assembly can be detachably mounted, and wherein an opening is provided in said arm and communicates said recess with the exterior, said opening being arranged to enable said drive assembly to be moved into and out of said recess, and wherein a seat for said drive assembly is formed within said recess, wherein said arm has an upper surface, a spaced lower surface and a lateral surface joining said upper and lower surfaces and defining the lateral extent of the end of the arm, and wherein said opening extends in the lower surface, in the lateral surface and in the upper surface of the arm, such that said opening comprises a lower zone allowing passage of the drive shaft towards the bowl, a lateral zone allowing passage of the drive shaft laterally out of and into said recess, and an upper zone allowing passage of said drive assembly, said bowl being generally cylindrical in shape, and the drive shaft of the tool, when the tool drive assembly is in its mounted position, extending along the vertical axis of said bowl.

BRIEF DESCRIPTION OF THE DRAWINGS

A preferred embodiment of the present invention will hereinafter be described, by way of example, with reference to the accompanying drawings, in which.

DESCRIPTION OF A PREFERRED EMBODIMENT

Figure 1:
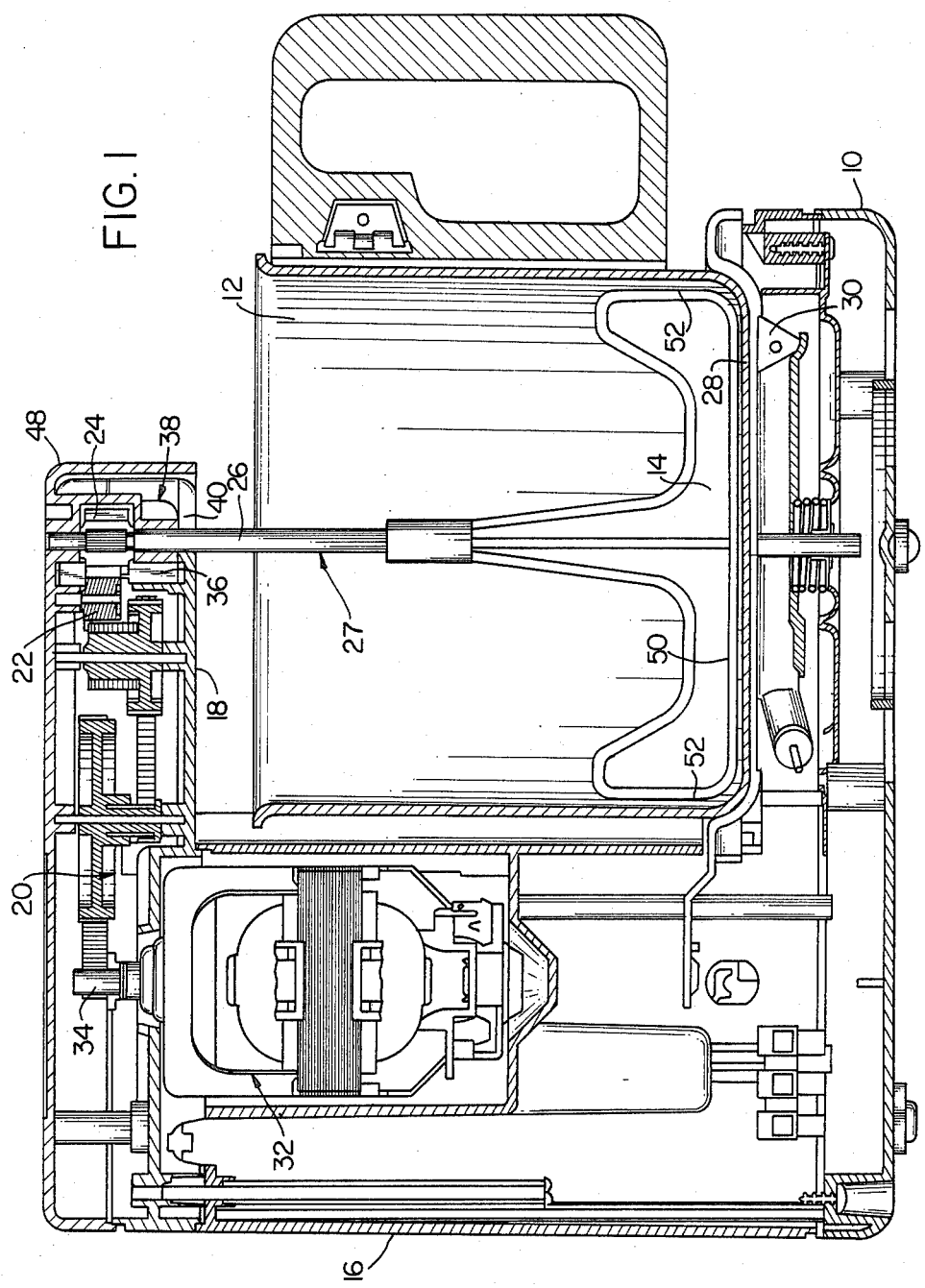
FIG. 1 is a longitudinal vertical section through food preparation apparatus of the invention showing its tool in its working position.

The apparatus shown in the drawings is intended to be used for the preparation of sauces, pastry mixes, and other foodstuffs and for culinary preparation in general. The apparatus comprises a base 10 on which a mixing bowl 12 is received. A rotating tool, such as a blade 14, extends within this bowl 12. A column 16 extends upwardly from the base 10 and supports at its top, an arm 18 which extends substantially horizontally above the bowl 12. The arm 18 houses a drive device 20 which includes a speed reducer comprised of two belt stages, and a drive toothed wheel 22 which engages with a pinion 24 arranged to rotate a shaft 26 coupled to the tool 14. The bowl 12 is generally cylindrical in shape, and, in the working position as shown in FIG. 1, the shaft 26 of the tool 14 extends coincident with the vertical axis of this bowl. The blade forming the tool is thus arranged diametrically relative to the bowl.

So that the foodstuff contained in the bowl 12 can be reheated or cooked, the base 10 includes means for heating the bottom 28 of this bowl. In the illustrated embodiment, the heating means comprise an electrical resistance 30.

The arm 18 is fixedly mounted to the top of the column 16. This column contains an electric motor 32 whose output shaft 34 engages the drive device 20 within the arm 18.

Figure 2:
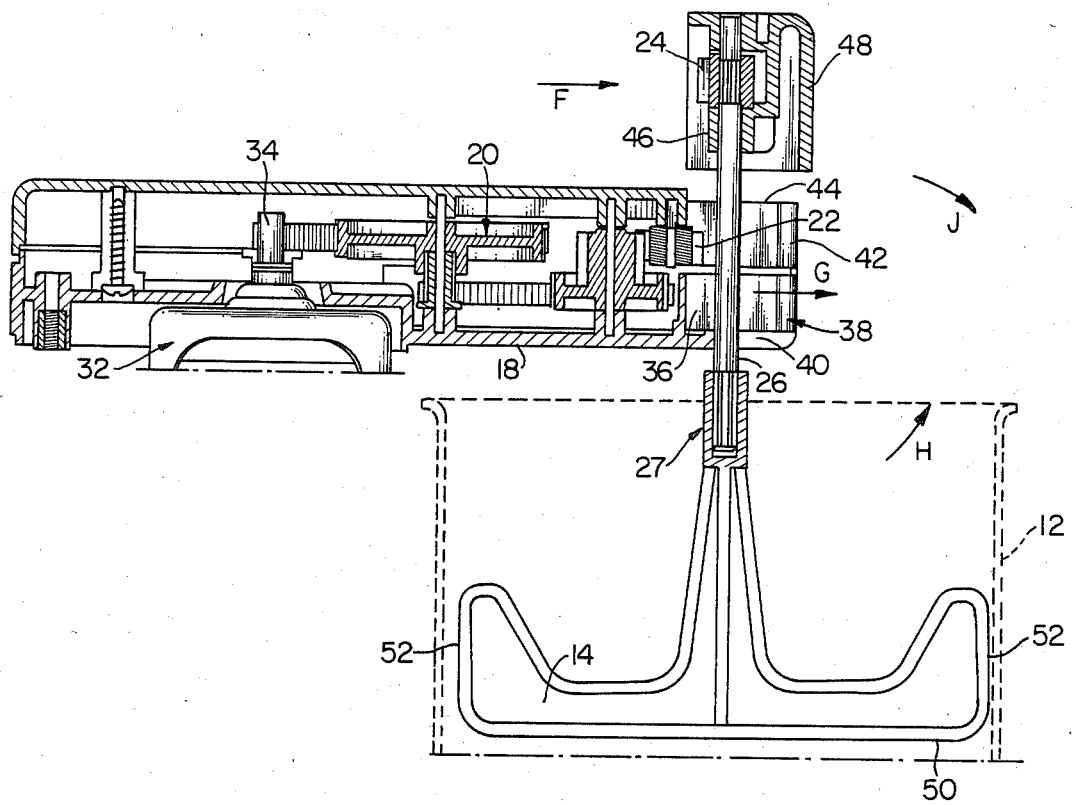
FIG. 2 is a partial vertical section through the apparatus showing the tool in its raised position for removal or fitting thereof.
Figure 3:
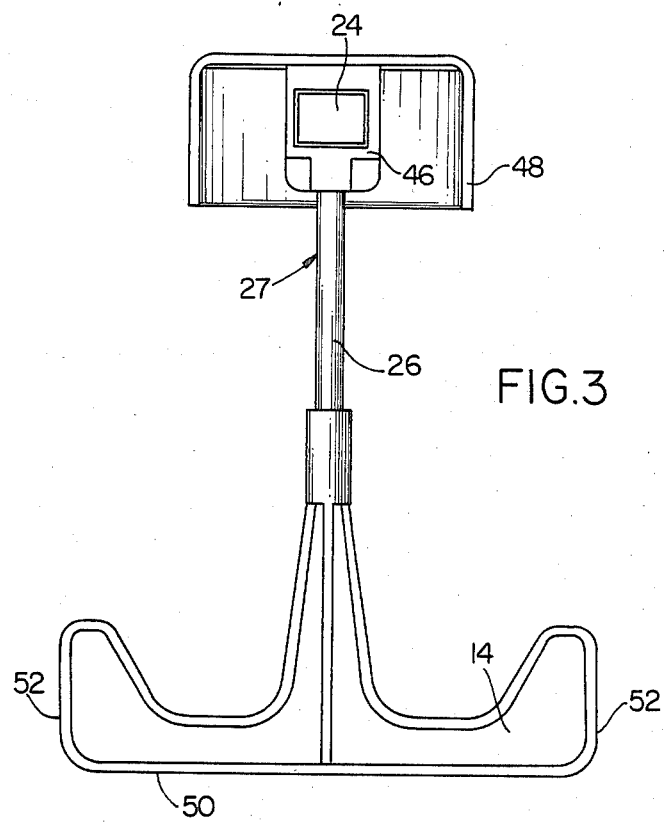
FIG. 3 shows an elevation of an assembly comprising the tool and its drive pinion, viewed in the direction of an arrow F of FIG. 2.
Figure 4:
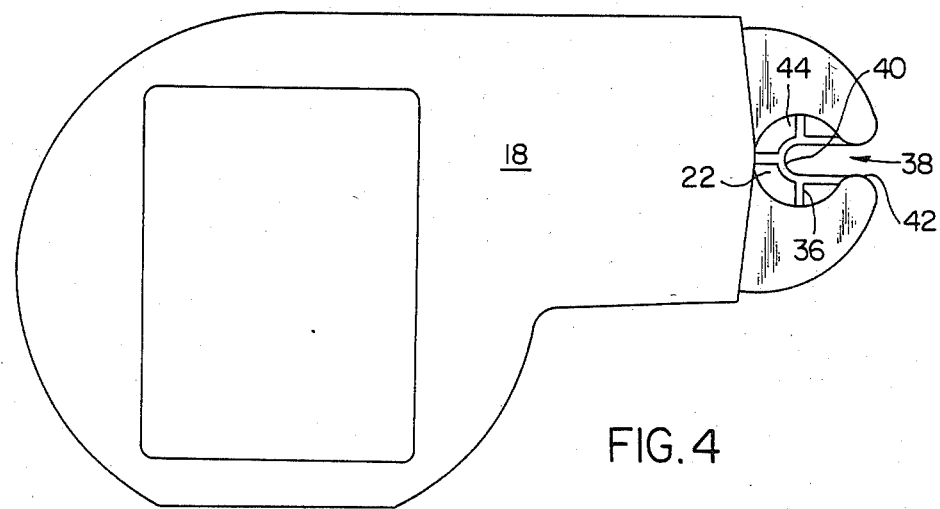
FIG. 4 is a plan view of the arm of the apparatus without the tool.

As is clearly illustrated in FIG. 2, the pinion 24 for driving the shaft 26 of the tool is, in fact, integral with this shaft 26, and the assembly 27 formed by the pinion 24 and the tool 14 is detachably mounted on a seat provided at the end of the arm 18. A recess 36 is formed within the seat and communicates with the exterior by way of an opening 38 through which the pinion 24 and the shaft 26 are able to pass when mounting or removing the said assembly 27 from the said seat.

The opening 38 starts in the bottom face of the arm 18 and extends through the external lateral surface of the end of the arm, and also extends in the upper face of this arm. The opening 38 thus formed comprises a narrow lower zone 40 allowing passage of the shaft 26 towards the bowl 12, and a narrow lateral zone 42 allowing passage of the shaft 26 when lateral translatory movement is performed for removing the tool 14, in the direction of arrow G in FIG. 2, or for mounting the tool. The opening 38 also has a wide upper zone 44 through which the pinion 24 can pass from above downwardly or from below upwardly when the mounting or removal of the tool is to be effected.

The pinion 24 and the shaft 26 are rotatably mounted in a semi-cylindrical bearing 46 which is itself mounted so as to be substantially vertically slidable within a guide formed, in the recess 36. The guide is formed by the internal wall of the wide upper zone 44 of the opening 38. The bearing 46 is integral with a cap 48 which can be fitted from above downwardly onto the end of the arm 18.

As is shown in FIG. 1, in the position where the tool is mounted in the apparatus, the bottom edge 50 of the blade 14 is immediately adjacent the bottom 28 of the bowl 12. Furthermore, the lateral edges 52 of this blade extend in the immediate vicinity of the cylindrical inner wall of the bowl.

If, when the apparatus is in the operating position shown in FIG. 1, it is required to remove the tool, the user should, first of all, take hold of the cap 48 and raise the assembly 27 to bring it to the position shown in FIG. 2. Then, the shaft 26 is moved out of the arm 18 through the open lateral zone 42 of the arm in the direction indicated by arrow G. The blade of the tool 14 can then be extracted easily in the direction of arrow H, after rotating it, if necessary, through a quarter of a revolution about its axis from the position shown, and after tilting slightly the assembly 27 as indicated by arrow J.

Of course, if required, after raising the assembly 27 as shown in FIG. 2, the user may remove both the bowl and the tool together by moving them laterally in the direction of the arrow G after raising the bowl slightly off the base 10.

The bowl and/or the tool are replaced in the apparatus by performed movements described above in reverse. In this respect, when the last of these movements is performed, that is, the assembly 27 is lowered towards the bowl, the cap 48 is also fitted onto the end of the arm 18 to cause the pinion 24 to engage the toothed wheel 22.

I claim:

1. Apparatus for food preparation comprising a base, a mixing bowl received on said base, a rotatable tool within said bowl, a column extending upwardly from said base and having a top end, an arm extending substantially horizontally above the bowl, said arm being supported by the top end of said column and having a free end and said arm further having an upper surface, a spaced lower surface and a lateral surface joining said upper and lower surfaces and defining the lateral extent of the end of the arm, an upwardly extending drive shaft of said tool being engageable with said arm, drive means for said tool contained within said arm, said drive means including a pinion for rotating the drive shaft of said tool, said pinion being fixed to said drive shaft to thereby form a drive assembly for the tool, a recess formed within the free end of said arm within which said drive assembly can be detatchably mounted, a seat for said drive assembly formed within said recess, and an opening provided in said arm by which said recess communicates with the exterior, said opening being so positioned as to enable said drive assembly to be moved into and out of said recess, said opening extending through the lower surface, the lateral surface and the upper surface of the arm, such that said opening comprises a lower zone allowing passage of the drive shaft toward the bowl and a lateral zone allowing passage of the drive shaft laterally out of and into said recess and an upper zone allowing passage of said drive assembly, said bowl being substantially cylindrical in shape, and, when the tool drive assembly is in its mounted position, the drive shaft of the tool extending along the vertical axis of said bowl, and at least one lateral edge of said tool lying in the immediate vicinity of a substantially cylindrical inner wall of said bowl.

2. Apparatus according to claim 1, wherein said drive assembly is rotatably mounted in a bearing which is itself mounted so as to be vertically slidable within said recess.

3. Apparatus according to claim 2, wherein said bearing is fixed to a cap which fits onto the end of the arm.

4. Apparatus according to claim 3, wherein the bearing is integral with said cap.

5. Apparatus according to claim 1, wherein, in the position wherein the tool is mounted, the bottom edge of said tool lies in the immediate vicinity of the bottom of the bowl.

6. Apparatus according to claim 1, wherein the arm is mounted in fixed fashion on the column.

7. Apparatus according to claim 1, wherein an electric motor is housed within the column, an output shaft of said motor being engaged with the drive means within the arm.

8. Apparatus according to claim 1, wherein means for heating said bowl are provided in said base.

* * * * *